United States Patent [19]

Ishii et al.

[11] Patent Number: 4,482,598

[45] Date of Patent: Nov. 13, 1984

[54] TRANSFER SHEETS AND PRODUCTION OF DECORATIVE ARTICLES THEREWITH

[75] Inventors: Taiji Ishii, Tokyo; Takashi Tarutani, Sakado, both of Japan

[73] Assignee: Dai Nippon Insatsu Kabushiki Kaisha, Japan

[21] Appl. No.: 419,525

[22] Filed: Sep. 17, 1982

[30] Foreign Application Priority Data

Sep. 21, 1981 [JP] Japan ............................... 56-149050

Apr. 12, 1982 [JP] Japan ............................... 57-60678

[51] Int. Cl.³ .......................... B32B 3/10; B32B 5/20; B32B 31/00

[52] U.S. Cl. ...................................... 428/195; 156/79; 156/240; 156/277; 428/159; 428/202; 428/209; 428/211; 428/913; 428/914

[58] Field of Search ............... 428/158, 159, 160, 202, 428/914, 195, 200, 201, 209, 211, 913; 156/79, 219, 220, 230, 234, 240, 277

[56] References Cited

U.S. PATENT DOCUMENTS

| | | | |
|---|---|---|---|
| 3,905,849 | 9/1975 | Bomboire | 428/159 |
| 3,914,485 | 10/1975 | Curtis | 428/159 |
| 4,217,385 | 8/1980 | Shortway | 428/159 |
| 4,247,353 | 1/1981 | Courtoy | 428/159 |
| 4,271,224 | 6/1981 | Muzuno et al. | 428/914 |
| 4,320,163 | 3/1982 | Schwartz | 428/195 |
| 4,367,071 | 1/1983 | Muzuno et al. | 428/914 |
| 4,407,881 | 10/1983 | Shima et al. | 428/195 |

*Primary Examiner*—William J. Van Balen
*Attorney, Agent, or Firm*—Parkhurst & Oliff

[57] ABSTRACT

A transfer sheet comprising a releasable substrate and a heat-foamable pattern, and preferably a further foaming inhibiting pattern formed thereon is prepared, and these patterns are transferred onto a foamable resin layer such as a polyvinyl chloride plastisol containing a blowing agent. The entire structure is heated, whereupon there is obtained a decorative article in which a resin layer, as a whole, has foamed, and at the same time, at the parts where the foamable resin pattern has been transferred, projecting convex parts are formed by the foaming of the heat-foamable pattern, while depressed concave parts are formed at parts onto which the foaming inhibiting pattern has been transferred.

20 Claims, 11 Drawing Figures

TRANSFER SHEETS AND PRODUCTION OF DECORATIVE ARTICLES THEREWITH

BACKGROUND OF THE INVENTION

This invention relates to a transfer sheet and to a process using the same for producing decorative articles.

As a method of printing, transfer printing (decalcomania) which is carried out with the use of a transfer sheet is known. A transfer sheet of very general type comprises a substrate, a release layer, and a printed layer. In addition, as desired, a protective layer for protecting the printed layer, a layer of an adhesive, and/or the like are provided after transferring.

Transfer sheets of this character are used for printing on various materials and articles such as artificial leather, soft vinyl chloride resin, plywood, ceramic articles, metals, and glass. Particularly in cases such as that wherein printing is carried out on an article having a material or shape which makes direct printing difficult to obtain clear printed patterns and the case where the number of impressions to be printed at one time is small, and, moreover, the number of patterns is large, the transfer printing method in which transfer sheets are used is convenient because a saving can be made in the time of printing itself and the time for handling after printing, and it is not necessary to change plates for changes in patterns.

Almost all of the printing performed heretofore on printed articles by the transfer printing method with the use of transfer sheets has given flat patterns. Where it is desired to obtain a pattern projecting from the surface of an article printed by transfer printing, it is a common practice to resort to a method such as that wherein an ink having a high solid content is used when forming the pattern on the transfer sheet or printing is carried out by a printing method in which the ink transfer quantity is great.

However, when an ink of high solid content is used, the viscoelasticity of the ink varies, which is not desirable from the standpoint of printability. A printing method in which the ink transfer quantity is great such as, for example, silk-screen printing, intaglio printing, or gravure printing in which the cell depth is great, is disadvantageous in that the rate of drying after printing is low. Furthermore, when the transfer sheet is produced by the sheet-fed printing method and piled or when it is produced by the rotary method and wound up, crushing of the printed pattern, deformation of the substrate, and other problems occur.

A transfer sheet used in the production of foamed flooring materials and the like and provided with a foaming inhibiting or suppressing pattern has heretofore been known. However, when a known transfer sheet provided with a foaming inhibiting pattern is used for producing a decorative article having a large area of depressed or concave parts, it is necessary to prepare the transfer sheet by using a great quantity of an expensive foaming inhibitor compound. Moreover, the transfer sheet thus obtained has a number of drawbacks such as its undergoing blocking after being wound up and its unsuitability for patterns of small area of projecting or convex parts. Furthermore, while concave parts of a low degree of foaming which are depressed from the surface after foaming could be produced even by the utilization of this transfer sheet, convex parts projecting from the surface after foaming could not be provided heretofore.

SUMMARY OF THE INVENTION

It is a primary object of this invention to overcome the above described difficulties encountered in the prior art and to provide a process for producing foamed decorative articles having foamed concave or projecting parts and, further, to provide transfer sheets therefor.

According to this invention in one aspect thereof, briefly summarized, there is provided a transfer sheet comprising a releasable substrate with a surface having releasability and a heat-foamable pattern formed on said surface.

According to this invention in another aspect thereof, briefly summarized, there is provided a process for producing decorative articles which comprises causing the pattern surface of the above defined transfer sheet to contact a heat-foamable material thereby to transfer the heat-foamable pattern onto the material and thereafter heating the material thereby to cause the foaming of the material and the formation of a pattern of convex projections at the parts onto which the heat-foamable pattern has been transferred.

In accordance with a preferred mode of practice of this invention, the transfer sheet has a foaming inhibiting pattern in addition to the heat-formable pattern. By the use of this transfer sheet to produce a decorative article, the foamed decorative article thus produced has, with respect to its standard or datum foamed surface, a pattern of convexities and a pattern of concavities. As a result, the pattern of concavities and convexities varies stepwise, and, moreover, by using the foamable pattern and the foaming inhibiting pattern according to their characteristics, a very diverse foamed pattern of concavities and convexities can be readily formed without restriction of the area of the convex parts or the concave parts. This is in contrast to the case of the conventional process wherein only a foaming inhibiting pattern is used or of the basic mode of this invention wherein only a foamable pattern is used.

The nature, utility, and further features of this invention will be more clearly apparent from the following detailed description, beginning with a consideration of general aspects of the invention and concluding with specific examples of practice thereof, when read in conjunction with the accompanying drawings, briefly described below.

BRIEF DESCRIPTION OF THE DRAWINGS

In the drawings, wherein the figures are enlarged, fragmentary sectional views taken along planes in the thickness direction of heat-foamable material layers and decorative articles.

DETAILED DESCRIPTION OF THE INVENTION

Figure 1:
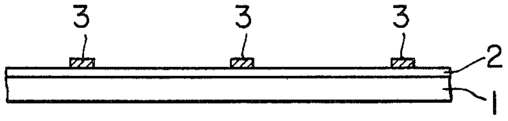
FIGS. 1 through 4 and FIG. 11 respectively show examples of transfer sheets according to this invention.
Figure 2:
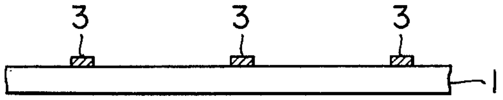
Figure 3:
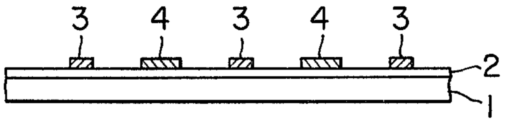

In its basic mode, the transfer sheet of this invention comprises, as shown in FIG. 1, a substrate 1, a release layer 2 provided on the substrate, and a heat-foamable pattern 3 formed on the release layer 2. In some cases, the release layer 2 may be omitted, as shown in FIG. 2. Furthermore, in addition to the heat-foamable pattern 3, an ordinary printed pattern 4 can also be formed as shown in FIG. 3. For the substrate 1, release layer 2, and ordinary printed pattern 4, materials known in this class of art can be used.

First, examples of materials usable for the substrate 1 are: papers such as tissue paper, vegetable parchment, parchment, and kraft paper; plastics films of resins such as polyethylene, polypropylene, polyvinyl chloride, polyvinylidene chloride, polyvinyl alcohol, polyethylene terephthalate, polycarbonates, nylons, polystyrene, ethylene-vinyl acetate copolymer, ethylene-vinyl alcohol copolymers, and ionomers; foils of metals such as aluminum, copper, tin, iron, and lead; and various suitable composite structures of these substrate materials.

Next, examples of the release layer 2 are those each comprising a suitable vehicle as a major component and those formed by a known coating method or a printing method with the use of a release paint prepared by further adding silicone, wax, or the like to the vehicle.

Examples of the vehicle constituting the release paint are: cellulose derivatives such as ethyl cellulose, ethyl hydroxyethyl cellulose, cellulose acetate propionate, and cellulose acetate; styrene resin and styrene copolymer resins such as polystyrene and poly-$\alpha$-methylstyrene; homo- or co-polymers of acrylic and methacrylic esters such as polymethyl methacrylate, polyethyl methacrylate, polyethyl acrylate, and polybutyl acrylate; rosin ester resins such as rosin, rosin-modified maleic acid resins, rosin-modified phenolic resins, and polymerized rosin; polyvinyl acetate resin; cumarone resin; vinyl toluene resins, vinyl chloride resins; polyester resin; polyurethane resin, butyral resin; polyamide resin, and vinyl chloride-vinyl acetate copolymers, one or more of which are used.

By suitably adding to any of the above enumerated vehicles additives selected from plasticizers, stabilizers, dispersants, fillers, solvents, and diluents, kneading the resulting mixture, and further adding a wax, silicone, or the like, a release paint is obtained.

With the use of a release paint prepared in the above described manner, the release layer 2 is formed on the substrate 1 by a coating method such as gravure coating, roll coating, air-knife coating, kiss-roll coating, spray coating, curtain-flow coating, dip coating, spinner coating, whirler coating, or brush coating or by a printing method such as gravure printing, gravure offset printing, litho-offset printing, direct lithography printing, letterpress printing, intaglio printing, silk-screen printing, or electrostatic printing.

Alternatively, the release layer 2 may be formed on the substrate 1 by melt-extruding thereonto a resin such as polyethylene resin, polypropylene resin, or ethylenevinyl acetate copolymer.

In general, the thickness of this release layer 2 is, for example, 1 to 50 $\mu$m and, more exactly, 1 to 5 $\mu$m by gravure coating, 5 to 10 $\mu$m by roller coating and 10 to 50 $\mu$m by melt-extrusion.

A release layer 2 of the above described character is suitably selected and provided with due consideration of the adhesiveness and peelability or releasability between the substrate 1 and the heat-foamable pattern 3 and the ordinary printed layer 4 described hereinafter. However, this release layer 2 may be omitted in the case where the surface of the substrate 1 itself possesses sufficient releasability. Examples of such substrates are films and sheets of polyethylene, polypropylene, polyester, and nylon.

For the heat-foamable pattern 3 to be formed on the surface of the above kind of substrate 1 (FIG. 2) or the surface of the release layer 2 of a substrate having a release layer (FIGS. 1 and 3), a heat-foamable ink prepared by mixing a blowing agent into an ink in which a suitable vehicle is employed is applied by a known printing method and thus formed into the pattern.

For the vehicle resin to constitute the foamable ink, a vehicle to constitute the above described release paint can be used. Further, to this vehicle a plasticizer, a stabilizer, dispersant, a filler, a coloring agent of a dye or pigment, a solvent, and a diluent are suitably added. Examples of the blowing agent which is also added are: inorganic blowing agents such as sodium bicarbonate, ammonium carbonate, sodium boron hydride, and silicon oxyhydride; organic blowing agents such as azodicarbonamide, axobisisobutyronitrile, dinitrosopentamethylenetetramine, para-toluenesulfonyl hydrazide, and 4,4'-oxy-bis-benzene sulfonyl hydrazide; and microballoons (or microspheres) ordinarily of a thermoplastic resin containing an organic solvent in gaseous form or in liquid form of low boiling point. The blowing agent is added in a quantity of 1 to 10 parts, preferably 2 to 8 parts, by weight to 100 parts by weight of the vehicle, and the resulting mixture is kneaded together with a solvent or the like to produce a foamable ink of a viscosity of, for example, 500 to 7,000 centipoises.

The foamable ink thus prepared is used to print the heat-foamable pattern 3 by a known process, preferred examples of which are gravure printing, gravure offset printing, litho-offset printing, direct lithography printing, letterpress printing, intaglio printing, jet printing, silk-screen printing, and electrostatic printing. Gravure printing and silk-screen printing, in which the ink transfer quantity is relatively great, are desirable. In this invention, however, since the printed pattern parts project because the foamable patter foams, there is no necessity of making the ink transfer quantity particularly greater than that under ordinary printing conditions. In gravure printing, the cell depth of the gravure plate is 100 to 250 $\mu$m, preferably 200 to 220 $\mu$m. In silk-screen printing, the screen ruling is 100 to 20 lines-/inch, preferably 40 to 20 lines/inch. The coating quantity, in general, is of the order of 5 to 100 $g/m^2$ (solid).

In addition to the above described processing, the transfer sheet of this invention may be provided with an ordinary pattern 4 (FIG. 3) formed by an ordinary ink. Furthermore, such an ordinary pattern and the heat-foamable pattern can be provided by suitable alignment and matching, for example, by using several units of the same printing press.

Figure 4:
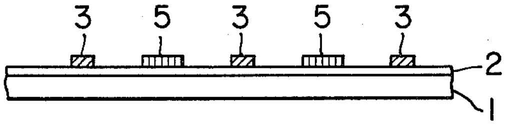

In a preferred form thereof, the transfer sheet of this invention has a foaming inhibiting pattern 5 in addition to the heat foamable pattern 3 as shown in FIG. 4.

This foaming inhibiting pattern 5 can be formed by using a composition containing a compound such as to inhibit the decomposition of the blowing agent or to inhibit the action of a blowing promoting agent for promoting the action of the blowing agent. Such a compound, i.e., a foaming inhibiting agent, is described in Japanese Pat. No. 578566 (Patent Publication No. 28636/1968). More specifically, a compound having the effect of raising the foaming temperature when combined with, for example, the blowing agent, an auxiliary blowing agent, and stabilizing agent used in the heat-foamable substrate material of the material to which the foaming inhibiting pattern is transferred is selected in accordance with the mode of practice. Examples of compounds from which this selection is made are: organic acids such as maleic acid, fumaric acid, adipic acid, and 1,2-phthalic acid, particularly organic acids each having at least two carboxyl groups and one hydroxyl group and having 2 to 12 carbon atoms; organic acid halides each having 2 to 20 carbon atoms, particularly acid chlorides; organic acid anhydrides each having 2 to 20 carbon atoms; polyhydric aromatic alcohols and ketones each having two functional groups and having 2 to 20 carbon atoms; and saturated amines each of 3 to 12 carbon atoms and unsaturated amines with a 6 to 10 member ring.

To this compound thus selected and a suitable vehicle are suitably added a coloring agent such as a pigment or a dye, a plasticizer, a stabilizer, a dispersant, a filler or extender, a solvent, and a diluent, and the resulting mixture is kneaded thereby to obtain a foaming inhibiting ink. For the above mentioned vehicle, one having adhesiveness relative to the material onto which the ink is to be transferred, heat resistance, and physical properties suitable for the use is selected from among the vehicles enumerated hereinbefore of the release paint to constitute the release layer 2.

Use of the foaming inhibiting ink in a known printing method, results in the above mentioned foaming inhibiting pattern 5. In the preparation of the foaming inhibiting ink, in general, 50 to 150 parts by weight of the foaming inhibiting agent is used relative to 100 parts by weight of the vehicle. These are kneaded together with a solvent or the like to a viscosity of the order of 60 to 500 centipoise and used for the printing. In general, the foaming inhibiting pattern is formed at a coating rate of 0.1 to 2 g/m$^2$ (solid).

The process of producing decorative articles of this invention in which transfer sheets of the invention are used will now be described.

In the case, for example, where a transfer sheet as shown in FIG. 1 is used, the process of producing decorative articles according to this invention is typically carried out in the following manner.

Figure 5:
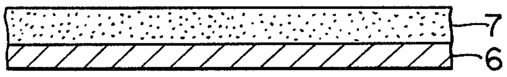
FIGS. 5 through 8 indicate intermediate steps in the process of producing a decorative article according to the invention.
Figure 6:
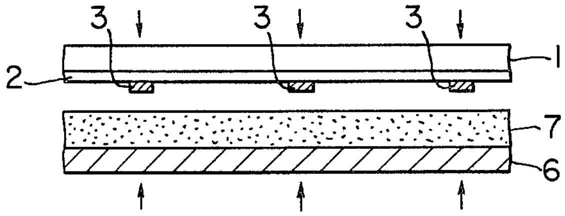

First, as shown in FIG. 5, a heat-foamable material layer 7 is formed on a suitable support 6. For the support 6, an ordinary support of a foamable resin sheet such as asbestos sheet, paper, particularly glass-fiber admixed paper, fabric, particularly glass-fiber fabric, or unwoven fabric, particularly glass-fiber unwoven fabric, is used.

For the heat-foamable material layer 7, a heat-foamable resin composition is prepared by adding a blowing agent to a thermoplastic resin and then suitably kneading the resulting mixture further with additives such as a plasticizer, a stabilizer, a coloring agent such as a pigment or a dye, a foaming promoter, a lubricant, an antistatic agent, and an ultraviolet ray absorbing agent. The heat-foamable material layer 7 is formed by applying the heat-foamable resin composition thus prepared as a coating on the support 6 by a known coating method such as gravure coating, roll coating, air-knife coating, kiss-roll coating, spray coating, curtain-flow coating, dip coating, spinner coating, whirler coating, brush coating, solid coating by means of a silk screen, or wire-bar coating, and drying the coating.

Examples of resins suitable for use as the above mentioned thermoplastic resin are: polyolefins such as polyethylene and polypropylene; polyolefinic copolymers such as ethylene-vinyl acetate copolymer, ionomers, and ethyl-vinyl alcohol copolymer; and other synthetic resins such as polystyrene, polyvinyl chloride, polyvinyl acetate, vinyl chloride-vinyl acetate copolymer, nylon, and acrylic resins. The blowing agent to be added to this synthetic resin is selected from among blowing agents similar to those employed for the aforedescribed heat-foamable pattern 3 by considering the softening point of the synthetic resin, the blowing temperature, and the combination with the foaming inhibiting agent used in the foaming inhibiting pattern 5.

Then, on the heat-foamable material layer 7 obtained in this manner, a transfer sheet obtained as described hereinbefore is superposed so that its surface on which a pattern has been formed contacts the layer 7, and, after application of heat and pressure, the substrate 1 (and the release layer 2) are peeled off and removed thereby to transfer the foamable pattern 3 onto the heat-foamable material layer 7.

In this process of transferring by applying heat and pressure, a heating press or a heating roll is advantageously used. The transferring conditions differ with the transfer sheet and the heat-foamable material, but examples of desirable items of conditions are a hot plate temperature of 150° to 200° C., a pressure of 50 to 70 kg/cm$^2$ when a heating press is used and are a surface temperature of the heating roll of 180° to 220° C. and a line pressure between the heating roll and the opposed roll with the transfer sheet and the heat-foamable material interposed therebetween of 8 to 10 kg/cm when a heating roll is used.

Figure 8:
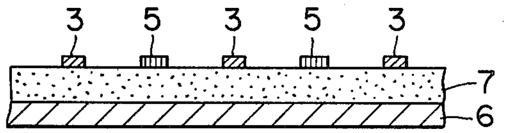

When a transfer sheet as illustrated in FIG. 4 is used similarly instead of the transfer sheet shown in FIG. 1, a foaming inhibiting pattern 5 as shown in FIG. 8 is additionally transferred. While not illustrated in the drawings, in the case where a transfer sheet on which an ordinary printed pattern 4 has been formed (for example, as indicated in FIG. 3) is used, this ordinary printed pattern 4 is transferred at the same time.

Figure 7:
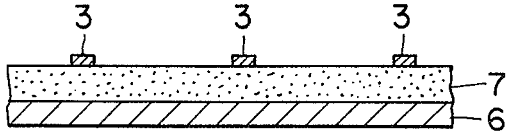
Figure 9:
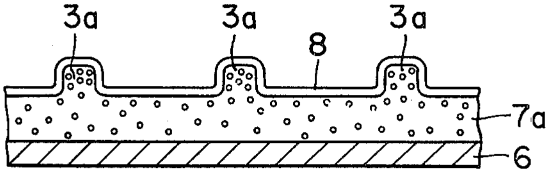
FIGS. 9 and 10 respectively show decorative articles produced by the process of the invention.
Figure 10:
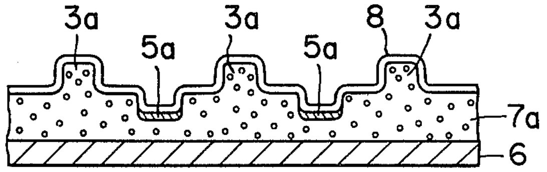

Then, by forming a transparent protective layer 8 according to necessity on the transferred pattern of each of the structures on which transfer patterns have been formed as shown in FIGS. 7 and 8, for example, and then heating substantially the entire structure, decorative articles having a pattern of concavities and convexities as shown in FIGS. 9 and 10 are obtained. That is, the foamable material 7 foams in entirety and becomes a foamed material layer 7*a*. On the other hand, corresponding to foamed pattern 3*a* and inhibited pattern 5*a*, convex or projecting parts and concave or depressed parts are respectively formed.

The heating for foaming can be carried out by known means such as a hot-air stream furnace or a far-infrared ray heater. While the heating conditions differ with the combination and blending proportions of the synthetic resin constituting the heat-foamable material, the plasticizer, and the blowing agent, example conditions are a heating temperature of 180° to 200° C. and a heating time of 1 to 3 minutes.

The transparent protective layer 8 is provided with a thickness of 100 to 300 μm, for example, for protecting the surface of product decorative article. This protective layer can be formed by using a synthetic resin similar to that used in the aforedescribed heat-foamable resin composition, suitably adding thereto a plasticizer, a stabilizer, a lubricant, an antistatic agent, an ultraviolet ray absorber, and other additives, kneading the resulting mixture to prepare a transparent resin composition, and forming the protective layer by a method similar to the aforedescribed coating method used to form the heat-foamable resin composition.

This transparent protective layer 8 can be formed also by coating after the pattern of concavities and convexities has been formed by the above described heat-foaming step, but such a coating work is difficult and furthermore has the effect of diminishing the pattern of concavities and convexities of the product. Accordingly, it is desirable that the protective layer 8 be formed prior to the foaming step, as described hereinbefore.

The processes of producing the transfer sheet and the decorative article according to this invention have been described above with respect to basic modes thereof. However, within the scope of the invention, these basic modes can be carried out in various modifications.

Some of modifications will be simply considered below.

Figure 11:
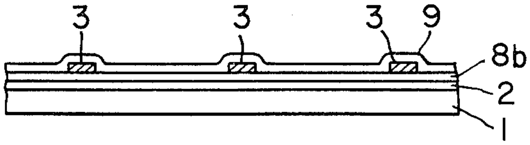

First, in the transfer sheet of this invention, as shown in FIG. 11 in correspondence with FIG. 1, a protective layer **8*b* similar to that designated by 8 in FIGS. 9 and 10 can be formed beforehand. Furthermore, it is also possible to form an adhesive layer 9 for the purpose of carrying out heating transfer efficiently. This adhesive layer 9** is formed as a layer of a thermoplastic resin which amply softens or melts at the temperature of the above mentioned heating transfer.

Further, for forming transfer patterns such as the heat-foamable pattern 3 on the heat-foamable material layer 7, other methods such as the following methods (a) and (b) can be used in addition to the above described method.

(a) The method in which a heat-foamable resin composition is formed as a coating on the pattern forming surface of the transfer sheet, and the substrate 1 of the transfer sheet is peeled off.

(b) The method which comprises applying as a coating the above mentioned heat-foamable resin composition on the surface of a suitable releasable substrate, laminating the same with a support similar to the support 6 in FIGS. 6 to 10 as desired, drying the laminate, peeling off the releasable substrate, causing the transfer sheet to contact the surface after the releasable substrate has been peeled off, and applying heat and pressure thereby to accomplish transferring.

Furthermore, as will be apparent from the foregoing description, the heat-foamable material layer 7 on which the transfer pattern has been formed can be made as a sheet or film of itself, in which case it is not necessary to use the support 6.

Because of the nature of this invention as described above, the heat-foamable pattern provided on the transfer sheet of the invention can be formed even without the use of an ink with an especially high solid content. Accordingly, an ink having a viscoelasticity in a desirable range for printing can be used. Moreover, there is no drawback of slow drying speed, and there is no risk of damaging the patterns even when the transfer sheets produced are stacked. Furthermore, even when the transfer sheet is used to produce a pattern in which the area of the convexities is small, there is no blocking as is observed in the case where only the foaming inhibiting pattern is used. Still another advantage of the transfer sheet of this invention is that when it is used, the foaming pattern can be applied to any substrate.

The convex or projecting parts obtained by the process of producing decorative articles of this invention are formed by the heat-foamable pattern which has been transferred and is then caused to foam. For this reason, softness similar to those formed by the foaming of the heat-foamable material can be imparted to the convex parts, and there is not disadvantageous wear of only the projecting parts in contrast to the case wherein the projecting parts are formed by the use of ink having a high solid content. Still another advantageous feature of the process of this invention is that the projecting parts can be formed in a stable and clear-cut manner in comparison with the known process wherein the foaming inhibiting compound content of the foaming inhibiting pattern is controlled by printing, etc.

Furthermore, the use of a transfer sheet having a foaming inhibiting pattern in addition to a heat-foamable pattern in accordance with a preferable mode of practice of this invention affords also the following advantages. Convex parts projecting from the surface after foaming and concave parts depressed from the surface can be provided by a single transfer step on the decorative article. Furthermore, since the convex parts and the concave parts are formed through separate actions, these convex and concave parts can be formed in a more stable and clear-cut manner than by the known process wherein the foaming inhibiting compound content of the foaming inhibiting pattern is controlled by printing or the like.

The process of producing decorative articles of this invention can be readily carried out through the use of a production line of products such as cushion floors and wall papers of the so-called chemical embossing method which heretofore has been carried out with the use of transfer sheets. The decorative articles thus obtained have convex and concave parts of delicately pleasant appearance and touch.

In order to indicate more fully the nature and utility of this invention, the following specific examples of practice thereof are set forth, it being understood that these examples are presented as illustrative only and are not intended to limit the scope of the invention.

EXAMPLE 1

On the surface of a wood free paper (basis weight of 50 g/m$^2$), a release layer comprising a polypropylene resin was formed by extrusion coating to a coating thickness of 25 $\mu$m. Next, in superposed state on this release layer, a pattern was printed by gravure printing with the use of a gravure ink for polyvinyl chloride printing comprising a vehicle of a vinyl chloride-vinyl acetate copolymer. Thereafter, a foamable ink was prepared by adding 5 parts by weight of azodicarbonamide relative to 100 parts by weight of a vehicle as a blowing agent to an ink for polyvinyl chloride printing similar to that for printing the pattern and mixing the resulting ink mixture. With the use of this ink, a foamable pattern was printed by gravure printing thereby to prepare a transfer sheet.

Separately, a heat-foamable composition of the composition set forth below was applied as a coating by the knife coating method on an asbestos paper of 0.7-mm thickness and dried by heating at a temperature of 160° C. for 1 minute. Thereafter, on the surface of the coated paper thus obtained, the above described transfer sheet was so superposed that the printed surface thereof contacted the surface of the coated paper. Then, by using a heating roll at a surface temperature of 200° C., the pattern was transferred under heating and pressing under a line pressure of 8 kg/cm and a speed of 0.1 m/sec. Thereafter, the releasable paper comprising the wood free paper and release layer was peeled off.

Composition of the heat-foamable composition

| | Parts by weight |
|---|---|
| Polyvinyl chloride resin (Kaneka vinyl paste PSL-37A mfd. by Kanegafuchi Kagaku Kogyo K.K.) | 100 |
| Dioctyl phthalate | 50 |
| Epoxidized soybean oil | 2 |
| Calcium carbonate | 10 |
| $TiO_2$ | 3 |
| ZnO | 2 |
| Azodicarbonamide | 3 |

After transferring, a transparent polyvinyl chloride plastisol was further applied, by using a wire bar, as a coating of 0.2-mm thickness in superposed state on the surface on which the pattern had been transferred. Thereafter, the entire structure was heated at a temperature of 200° C. for 2 minutes to cause foaming, whereupon a decorative article in which the parts of the foamable pattern foamed and projected outward to become convex parts was obtained. When used as a flooring material, the decorative article thus obtained was found to have a magnificent exterior appearance and moreover, possessed good resistance to abrasive wear.

EXAMPLE 2

A foaming inhibiting ink was prepared by adding, as a foaming inhibitor agent, 80 parts by weight of a trimetallitic acid anhydride relative to 100 parts by weight of a vehicle to an ink for vinyl chloride printing similar to that used in the forming of the ordinary printed pattern in Example 1 and mixing the resulting mixture.

A transfer sheet was prepared as in Example 1 except that a foaming inhibiting pattern was formed with this foaming inhibiting ink between the ordinary printed pattern and the foamable printed pattern.

A decorative article was obtained as in Example 1 except for the use of this transfer sheet. Thus, a decorative article in which the parts of the foamable pattern expanded outward to become convex parts, while the parts of the foaming inhibiting pattern became depressed to become concave parts was obtained. Used as a flooring material, this decorative article exhibited a magnificent exterior appearance and, moreover, good resistance to abrasive wear.

What is claimed is:

1. A transfer sheet for producing decorative articles having foamed convex parts, comprising:
   a substrate having a surface for releasably supporting a pattern thereon; and
   a pattern of material with the ability to foam in the presence of heat, releasably supported upon said surface.

2. The transfer sheet according to claim 1, wherein a pattern for inhibiting foaming is further disposed on said surface.

3. The transfer sheet according to claim 1, further comprising an ordinary printed pattern disposed on said surface.

4. The transfer sheet according to claim 1, wherein said substrate is provided with a releasable layer disposed thereon.

5. The transfer sheet according to claim 1, further comprising an adhesive layer disposed on said pattern of material with the ability to foam in the presence of heat.

6. A method of making a transfer sheet having foamed convex parts comprising the steps of:
   (a) forming a first laminate by disposing a heat-foamable pattern over a substrate layer;
   (b) forming a second laminate by disposing a heat-foamable layer over a base layer;
   (c) transferring said heat-foamable pattern disposed on said first laminate to said heat-foamable layer of said second laminate;
   (d) disposing a transparent protective layer over said transferred heat-foamable pattern; and
   (e) foaming said heat-foamable layer and said heat-foamable pattern of said second laminate thereby forming a transfer sheet having foamed convex parts.

7. The method of claim 6, wherein the heat-foamable layer comprises a polyvinyl chloride plastisol containing a foaming agent.

8. The method of claim 6, wherein said substrate layer of said first laminate comprises a material selected from the group consisting of polyethylene, polypropylene, polyester and nylon.

9. The method of claim 6, further comprising the step f disposing a printed pattern on said first laminate.

10. The method of claim 6, further comprising the step of disposing on said first laminate, a foaming pattern for inhibiting foaming of said heat-foamable layer of the said second laminate.

11. The method of claim 6, further comprising the step of disposing a transparent protective layer between said substrate layer and said heat-foamable pattern of said first laminate.

12. The method of claim 6, further comprising the step of disposing an adhesive layer over said heat-foamable pattern and said substrate layer of said first laminate.

13. The method of claim 11, further comprising the step of disposing an adhesive layer over said heat-foamable pattern and said substrate layer of said first laminate.

14. The method of claim 6, wherein step (a) includes forming a first laminate by disposing a release layer on a substrate layer and disposing the heat-foamable pattern on said release layer.

15. The method of claim 14, wherein said substrate layer of said first laminate comprises a material selected from the group consisting of polyester, polypropylene, polyethylene and nylon.

16. The method of claim 14, further comprising the step of disposing a printed pattern on said first laminate.

17. The method of claim 14, further comprising the step of disposing on said first laminate, a foaming pattern for inhibiting foaming of said heat-foamable layer of said second laminate.

18. The method of claim 14, further comprising the step of disposing a transparent protective layer between said substrate layer and said heat-foamable pattern of said first laminate.

19. The method of claim 14, further comprising the step of disposing an adhesive layer over said heat-foamable pattern and said substrate layer of said first laminate.

20. The method of claim 18, further comprising the step of disposing an adhesive layer over said heat-foamable pattern and said substrate layer of said first laminate.

* * * * *